(12) United States Patent
Peng (10) Patent No.: US 7,107,056 B2
(45) Date of Patent: Sep. 12, 2006

(54) METHOD AND SYSTEM FOR ESTIMATING MOVEMENT SPEED OF MOBILE UNIT

(75) Inventor: Bao-Chi Peng, Taipei (TW)

(73) Assignee: Benq Corporation, Taoyuan (TW)

( * ) Notice: Subject to any disclaimer, the term of this patent is extended or adjusted under 35 U.S.C. 154(b) by 262 days.

(21) Appl. No.: 10/618,021

(22) Filed: Jul. 14, 2003

(65) Prior Publication Data

US 2004/0082331 A1    Apr. 29, 2004

(30) Foreign Application Priority Data

Oct. 25, 2002    (TW) ............................ 91124966 A (51) Int. Cl.
*H04Q 7/20* (2006.01)

(52) U.S. Cl. .................. 455/441; 455/436; 455/456.1; 455/456.2; 455/456.5; 455/456.6; 455/422.1; 375/148; 375/150; 375/152

(58) Field of Classification Search ............... 455/441, 455/436, 456.1–456.6, 422.1; 342/104–108; 370/331; 375/148, 150, 152
See application file for complete search history.

(56) References Cited

U.S. PATENT DOCUMENTS 5,396,253 A * 3/1995 Chia ..................... 342/104
6,680,967 B1 * 1/2004 Westman ................. 375/148
2002/0042279 A1 * 4/2002 Da Rocha et al. .......... 455/456
2003/0003914 A1 * 1/2003 Kubo et al. ................. 455/441
2003/0176201 A1 * 9/2003 Sih et al. .................... 455/502
2003/0198285 A1 * 10/2003 Qi et al. ..................... 375/148
2004/0002306 A1 * 1/2004 Haapoja et al. ............. 455/69
2004/0097196 A1 * 5/2004 Rached et al. ........... 455/67.11
2004/0097197 A1 * 5/2004 Juncker et al. .......... 455/67.11
2004/0125771 A1 * 7/2004 Subrahmanya ............. 370/332
2005/0095989 A1 * 5/2005 Brouwer ..................... 455/69

FOREIGN PATENT DOCUMENTS

GB         2276064 A  *  9/1994

* cited by examiner

*Primary Examiner*—George Eng
*Assistant Examiner*—Khai Nguyen
(74) *Attorney, Agent, or Firm*—Pillsbury Winthrop Shaw Pittman LLP; Michael Bednarek (57) ABSTRACT

The present invention is related to a method for estimating a movement speed of a mobile unit in a mobile radio communication system. First, a signal from the mobile unit is received. Then, a first signal is generated by using a first filter having a first cut-off frequency to filter the signal. A first speed is obtained based on the first signal. A second signal is further generated by using a second filter having a second cut-off frequency to filter the signal. A second signal is obtained based on the second signal. Then the movement speed of the mobile unit is determined according to the first speed and the second speed.

16 Claims, 7 Drawing Sheets

METHOD AND SYSTEM FOR ESTIMATING MOVEMENT SPEED OF MOBILE UNIT

CROSS REFERENCE TO RELATED APPLICATIONS

This Application claims priority to Taiwan Patent Application No. 091124966 entitled "Method and System for Estimating Movement Speed of Mobile Unit", filed Oct. 25, 2002.

FIELD OF THE INVENTION

The present invention relates to a method and system for estimating movement speed of a mobile unit, and more particularly, to a method and system for estimating movement speed of a mobile unit by using a plurality of filter units having different cut-off frequencies to filter signal.

BACKGROUND OF THE INVENTION

In a mobile radio communications system, information is exchanged between a mobile unit and a base station by radio signals. Since each base station can communicate with a mobile unit only within its radio coverage (cell), a plurality of base stations are needed to cover the whole service area. To avoid interruption of service when the mobile unit moves from one cell to another cell (roaming), a method is required to connect the mobile unit with the second cell at an appropriate time. The process of transferring between stations is called "handover."

Methods of implementing handover of a call to or from a mobile unit between cells in a mobile radio communication system affect the overall efficiency and quality of the service. Therefore, it is important to provide a method of achieving a fast and reliable handover between cells.

Figure 1:
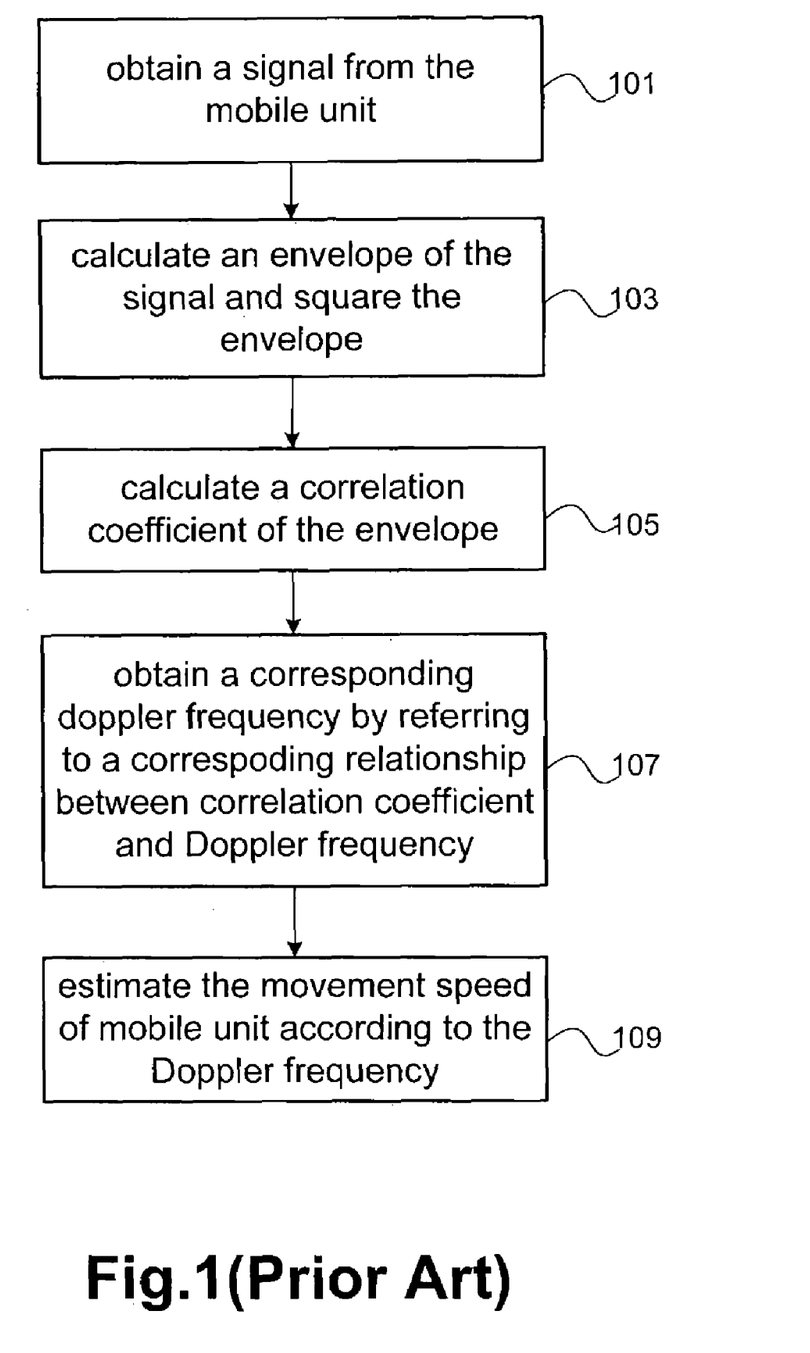
FIG. 1 shows a conventional method of estimating movement speed of a mobile unit.

Generally, the speed of mobile unit is an important factor to determine whether it is worthwhile implementing handover of a mobile unit between cells. The vehicular speed can be measured directly, but the method is not suitable for cellular radio applications. As an alternative, the vehicular speed may be estimated by monitoring the Doppler shift of a carrier frequency. FIG. 1 shows the conventional method of estimating movement speed of a mobile unit. First, a signal from the mobile unit is obtained in step 101. An envelope of the signal is calculated and the envelope is squared in step 103. According to the result of step 103, a correlation coefficient is calculated in step 105. Then, a corresponding Doppler frequency is obtained in step 107 by referring to a corresponding relationship between correlation coefficient and Doppler frequency. Lastly, the movement moving speed of the mobile unit is estimated according to the Doppler frequency in step 109.

Figure 2:
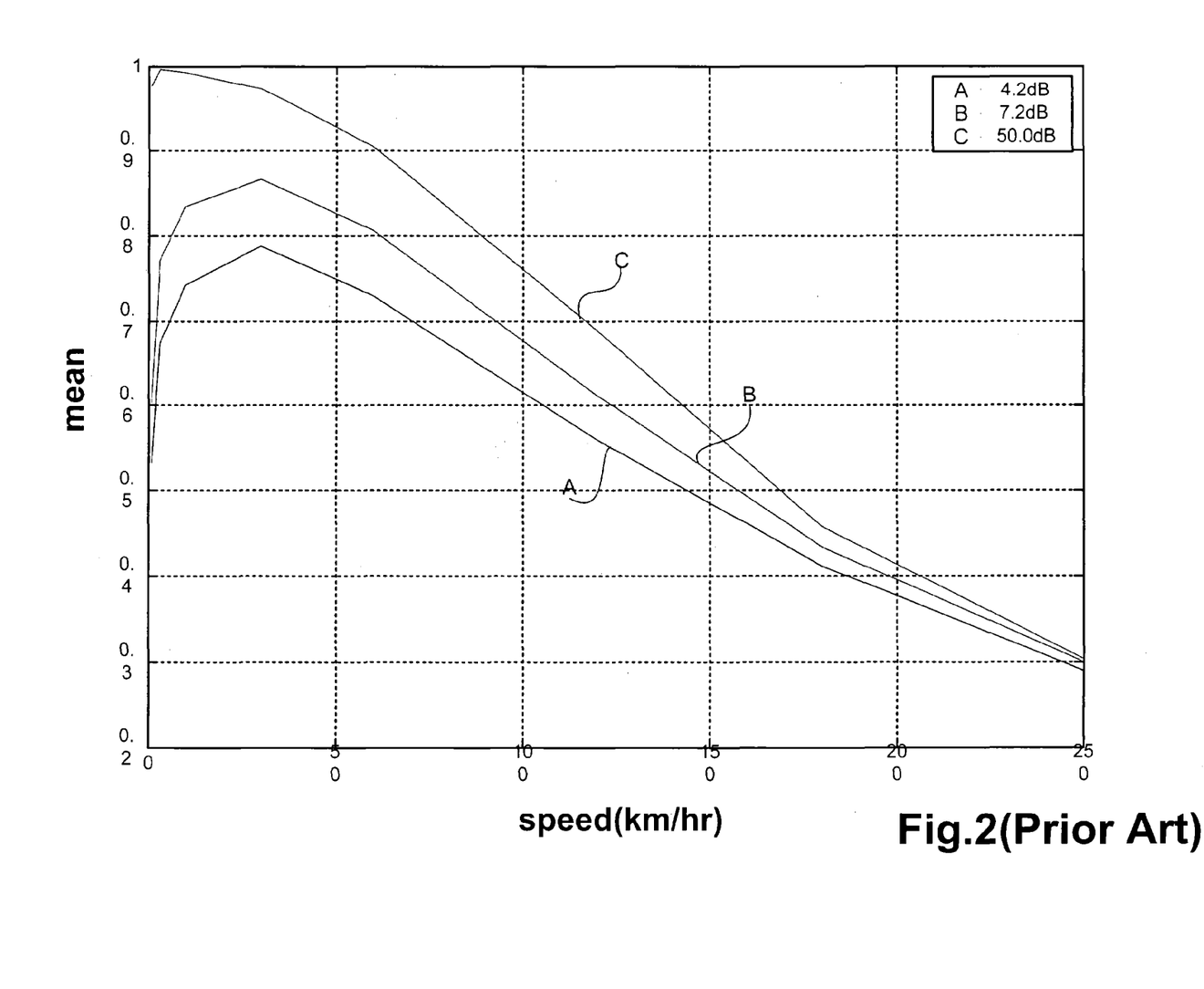
FIG. 2 shows the performance of the prior art.

However, this conventional method was limited. It can not accurately measure the movement speed of the mobile unit when the mobile unit moves at a low velocity. FIG. 2 shows the performance of the prior art. Three distinct curves A, B, and C respectively represent three mobile units having distinct powers of carrier signal. Obviously, when the three mobile units move below a specific speed, e.g. 18 km/hr, the curves A, B, and C bend down sharply. As such, one correlation coefficient mean value may map two distinct speeds, which prevents the system from determining the correct movement speed of the mobile unit.

SUMMARY OF THE INVENTION

The present invention provides a method and system for estimating movement speed of a mobile unit in a mobile radio communication system. A wider range of measure and improved performance at low-velocity can be achieved by using the method of the present invention. In addition, by using the system of the present invention, the mobile radio communication system can measure the movement speed of the mobile unit with low velocity with even greater accuracy.

First, a signal corresponding to a mobile unit transmitted signal is received. The present invention uses a first filter unit to filter the signal and generates a first signal. The first filter unit has a first cut-off frequency. Then, the present invention obtains a first speed by estimating the movement moving speed of the mobile unit based on the first signal. The present invention further uses a second filter unit to filter the signal and generates a second signal. The second filter unit has a second cut-off frequency. The present invention obtains a second speed by estimating the movement speed of the mobile unit based on the second signal. The present invention selects the first speed or the second speed to be the movement speed of the mobile unit.

The present invention also provides a system for estimating a movement speed of a mobile unit. The system includes a receiving unit, a first filter unit, a first estimating unit, a second filter unit, a second estimating unit, and a selecting unit. The receiving unit receives a signal corresponding to a mobile unit signal. The first filter unit filters the signal to generate a first signal. The first filter unit has a first cut-off frequency. The first estimating unit estimates the movement speed of the mobile unit and obtains a first speed. The second filter unit filters the signal to generate a second signal. The second filter unit has a second cut-off frequency. The second estimating unit estimates the movement speed of the mobile unit and obtains a second speed. The selecting unit selects the first speed or the second speed to be the movement speed of the mobile unit. Furthermore, the selecting unit selects the second speed to be the movement speed while the first speed is slower than a predetermined speed.

BRIEF DESCRIPTION OF THE DRAWINGS

FIG. 5 (a) shows the first exemplary embodiment of the present invention;

FIG. 5 (b) shows the estimation unit of the present invention; and

DETAILED DESCRIPTION OF THE INVENTION

Figure 3:
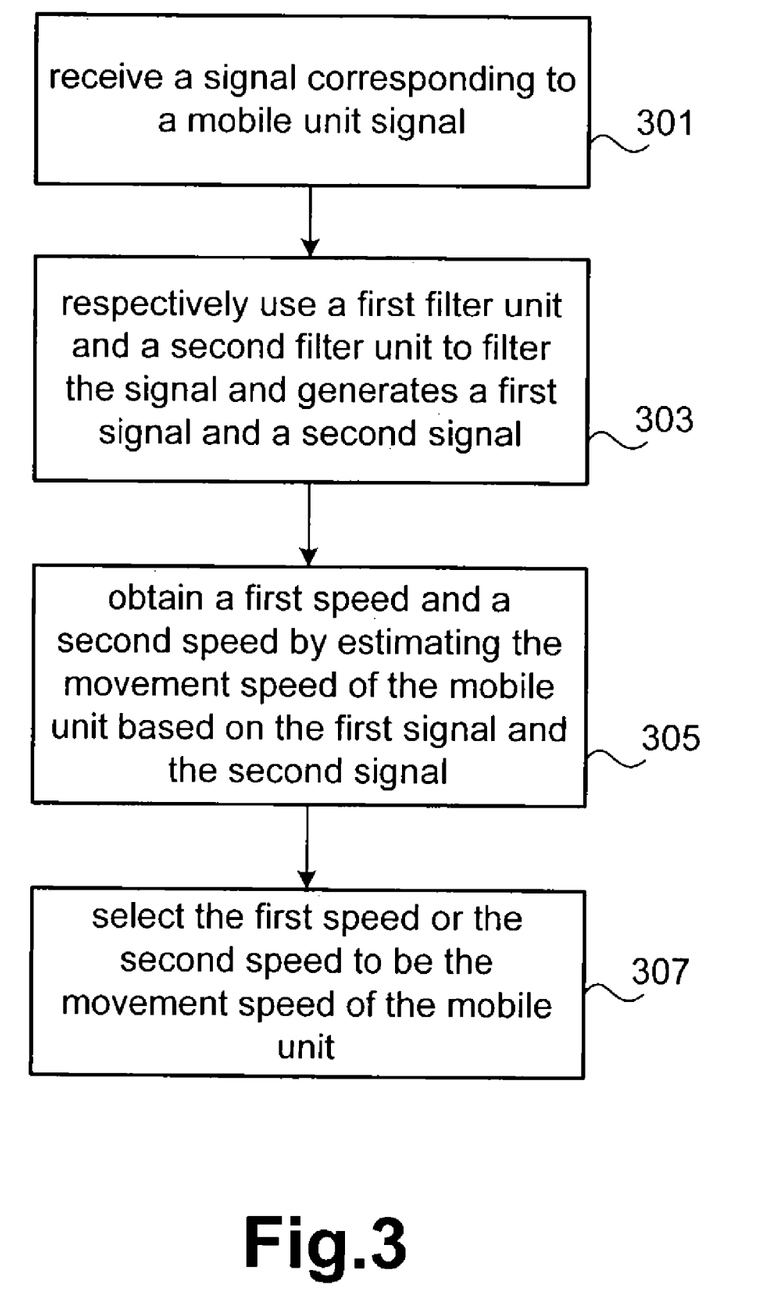
FIG. 3 is a flowchart of the present invention.

FIG. 3 is a flowchart of the present invention. First, the present invention receives a signal corresponding to a mobile unit transmitted signal in step 301. The present invention, in step 303, respectively uses a first filter unit and a second filter unit to filter the signal and generates a first signal and a second signal. The first filter unit has a first cut-off frequency and the second filter unit has a second cut-off frequency which is lower than the first cut-off frequency. The present invention, in step 305, obtains a first speed by estimating the movement speed of the mobile unit based on the first signal and obtains a second speed by estimating the movement speed based on the second signal. In step 307, the present invention selects the first speed or the second speed to be the movement speed.

The method of estimating speed of a mobile unit is first to square the envelopes of the first signal and the second signal. Then, the method respectively calculates correlation coefficients of the signals and obtains Doppler frequencies of the correlation coefficients by referring to a corresponding relationship between correlation coefficient and Doppler frequency. The method further estimates the first speed and the second speed of the mobile unit according to the Doppler frequencies.

Figure 4:
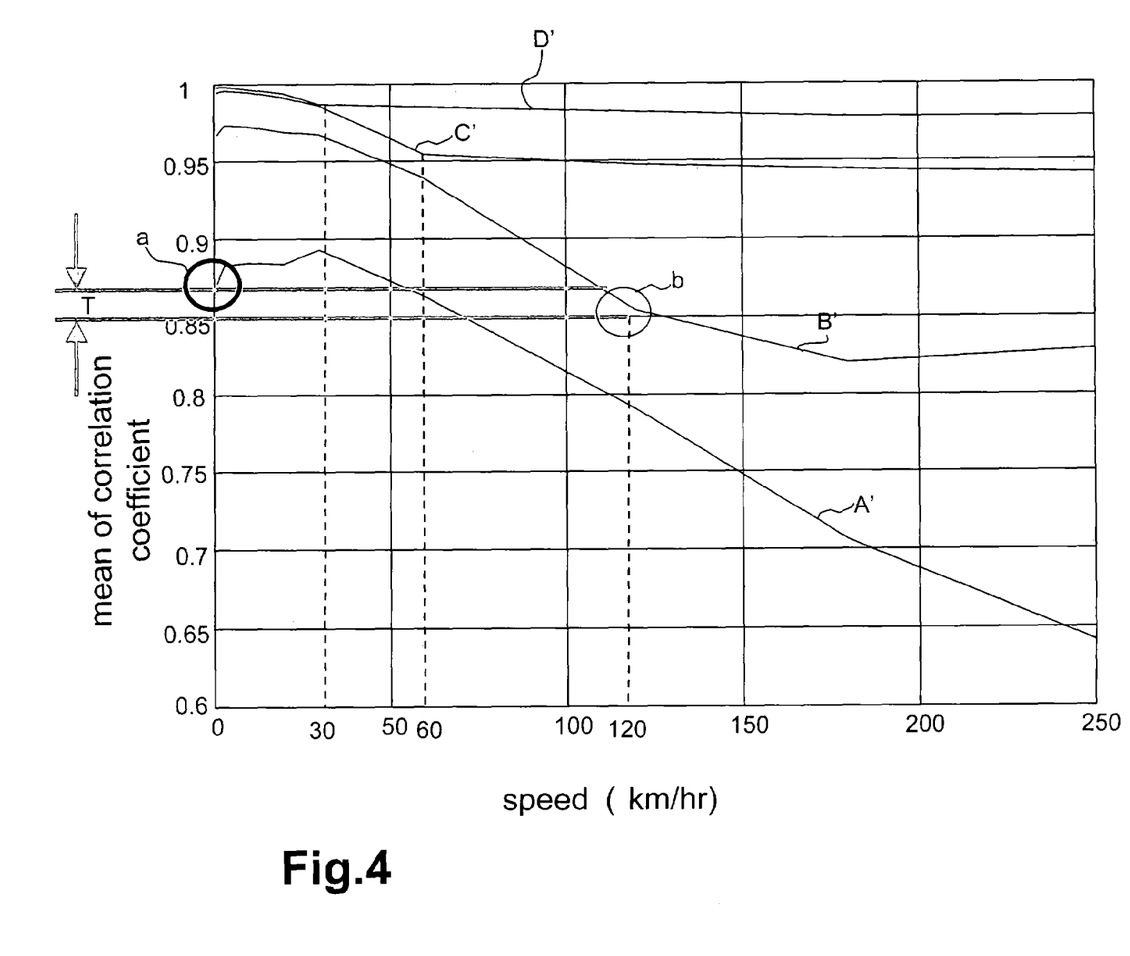
FIG. 4 shows the performances of different filter units of the present invention.

FIG. 4 shows the performances of using different filter units of the present invention. This embodiment uses four filter units to filter the signal corresponding to the mobile unit signal. The signals are received from the mobile unit by the rake receiver of the base station. The cut-off frequencies of the four filter units respectively are 375 Hz, 250 Hz, 125 Hz, and 62.5 Hz.

Curves A', B', C' and D' respectively represent the performances of using the filter units with the cut-off frequencies of 375 Hz, 250 Hz, 125 Hz, and 62.5 Hz. When the mobile unit moves below a specific speed, one mean of correlation coefficient value may map two distinct speeds in curve A', which prevents the system from determining the correct movement speed of the mobile unit. Therefore, the present invention defines a T zone which is a common zone of curve A' and B'. The minimum of the T zone is defined by the lowest point "a" of the curve A' after bent. The maximum of the T zone is defined by the correlation coefficient mean "b" corresponding to the cut-off frequency of curve B'. When the movement speed falls into the T zone, the present invention selects the speed estimated according to curve B' to be the movement speed of the mobile unit. The present invention further obtains a first predetermined speed based on the T zone. In other words, the present invention selects curve B' when the mobile unit moves below the first predetermined speed. For example, the present invention selects the movement speed estimated by using the filter unit with 250 Hz cut-off frequency instead of the filter unit with 325 Hz cut-off frequency, when the mobile unit moves below a first predetermined speed of 120 km/hour.

Similarly, when the mobile unit moves below a specific speed, one mean of correlation coefficient mean value may map two distinct speeds in curve B', which prevents the system from determining the correct movement speed of the mobile unit. Therefore, the present invention defines a common zone for curve B' and curve C' and further obtains the movement speed. The present invention selects the movement speed estimated by using the filter unit with 125 Hz cut-off frequency instead of the filter unit with 250 Hz cut-off frequency, when the mobile unit moves below a second predetermined speed of 60 km/hour.

When the mobile unit moves below a specific speed, one mean of correlation coefficient value may map two distinct speeds in curve C', which prevents the system from determining the correct movement speed of the mobile unit. Therefore, the present invention defines a common zone for curve C' and curve D' and further obtains the movement speed. The present invention selects the movement speed estimated by using the filter unit with 62.5 Hz cut-off frequency instead of the filter unit with 125 Hz cut-off frequency, when the mobile unit moves below a third predetermined speed of 30 km/hour.

Figure 5A:
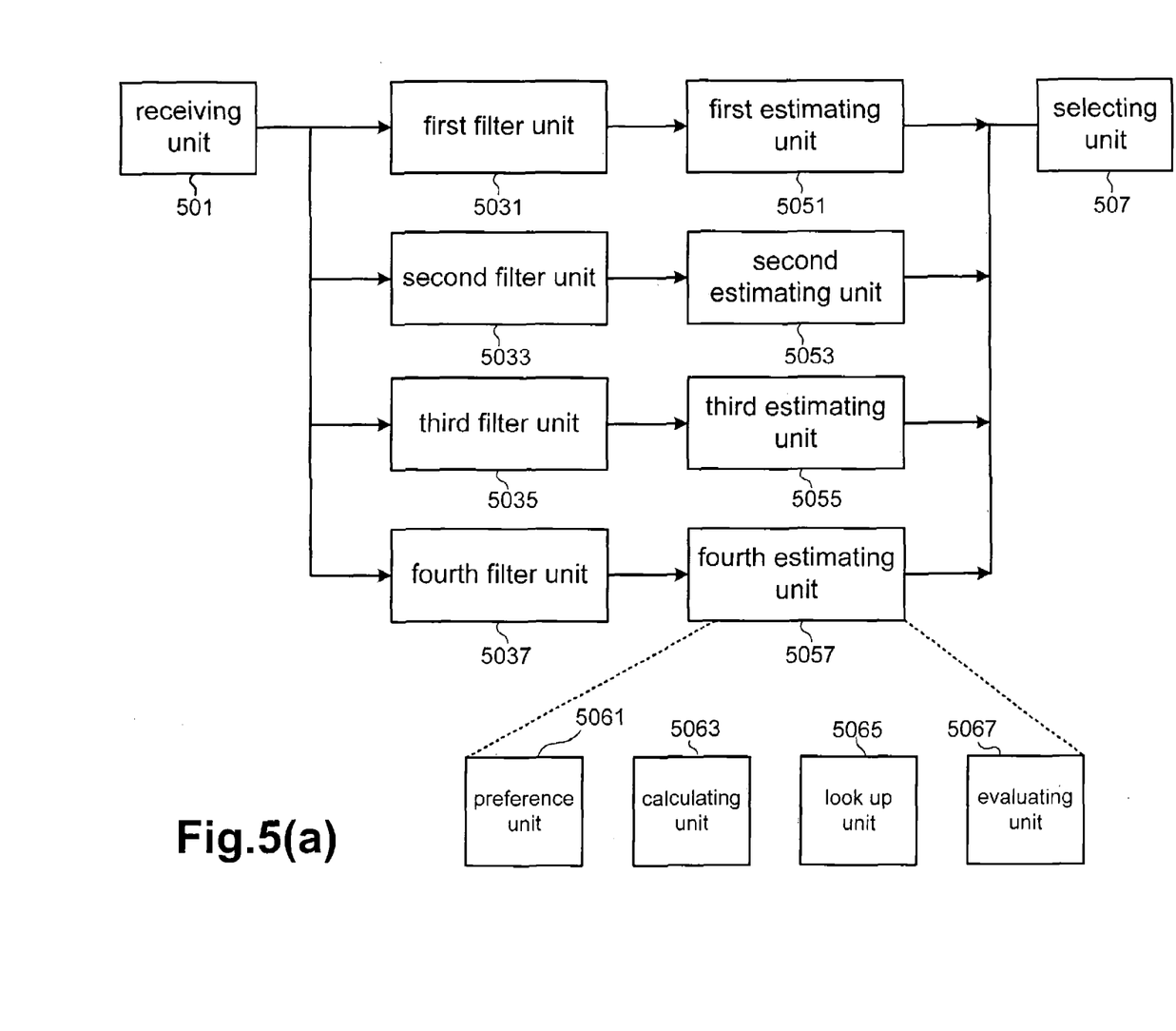

FIG. 5(a) shows the first exemplary embodiment of the present invention. The embodiment includes a receiving unit 501, a first filter unit 5031, a second filter unit 5033, a third filter unit 5035, a fourth filter unit 5037, a first estimating unit 5051, a second estimating unit 5053, a third estimating unit 5055, a fourth filter unit 5057, and a selecting unit 507. The cut-off frequencies of the first filter unit 5031, second filter unit 5033, third filter unit 5035, and fourth filter unit 5037 respectively are 375 Hz, 250 Hz, 125 Hz, and 62.5 Hz.

The receiving unit 501 receives the signal corresponding to the mobile unit transmitting signal. The first filter unit 5031, second filter unit 5033, third filter unit 5035, and fourth filter unit 5037 respectively filter the signal to generate a first signal, a second signal, a third signal, and a fourth signal. The first estimating unit 5051, second estimating unit 5053, third estimating unit 5055, and fourth filter unit 5057 respectively estimate the movement speed of the mobile unit based on the first signal, second signal, third signal, and fourth signal and respectively obtain a first speed, a second speed, a third speed, and a fourth speed.

Figure 5B:
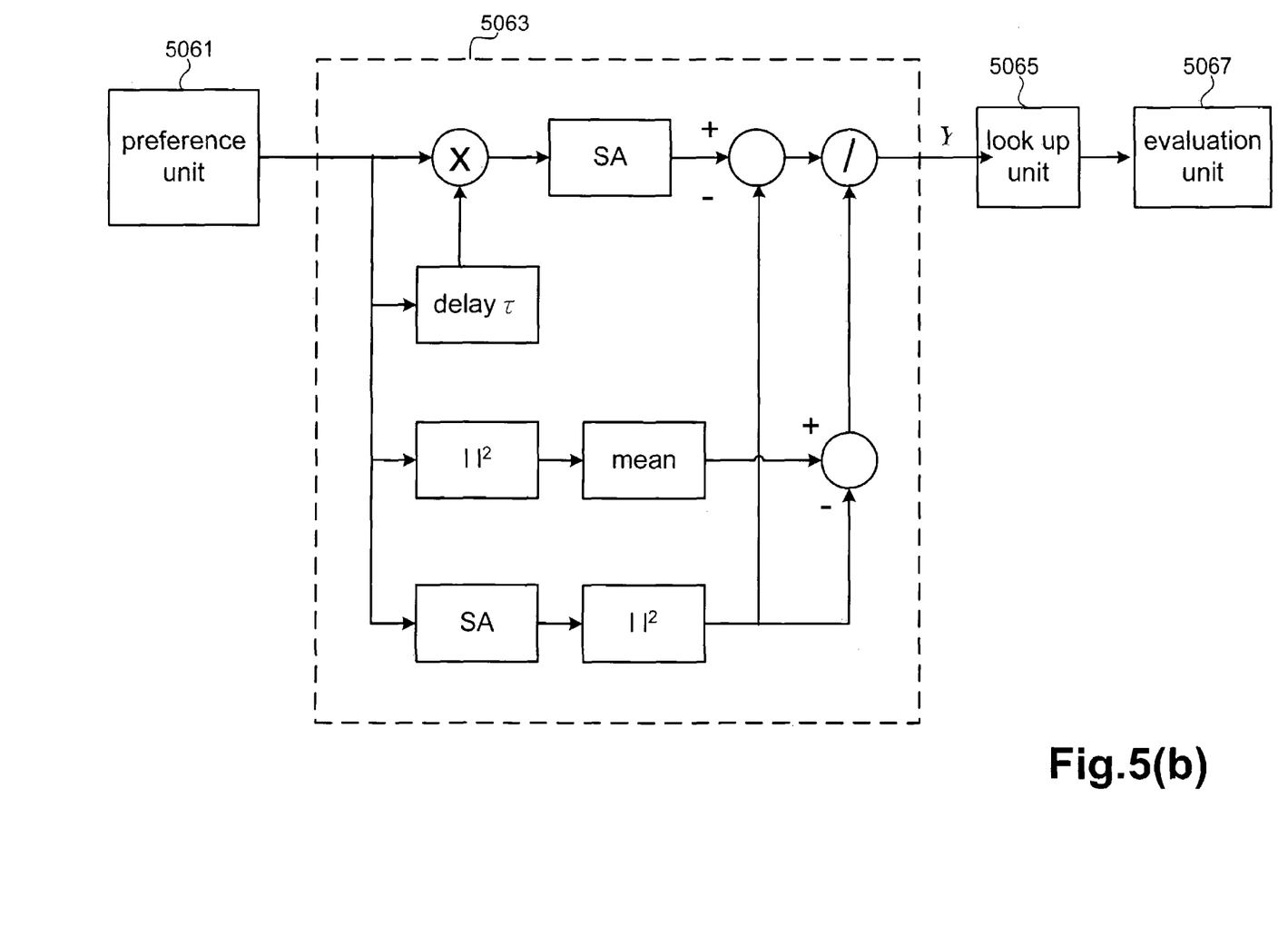

The first estimating unit 5051, second estimating unit 5053, third estimating unit 5055, and fourth estimating unit 5057 respectively have a preference unit 5061, a calculating unit 5063, a look up unit 5065, and an evaluating unit 5067. As shown in FIG. 5(b), each preference unit calculates the square of absolute value of the filtered signal. The calculating unit calculates a correlation coefficient $\rho$ of the signal. The look up unit obtains a Doppler frequency of the correlation coefficient $\rho$ referring to a corresponding relationship between correlation coefficient and Doppler frequency. The estimating unit estimates the movement speed of the mobile unit according to the Doppler frequency.

The selecting unit 507 selects the movement speed among the first speed, second speed, third speed, and fourth speed by the method mentioned above.

Selecting unit 507 selects the second speed estimated by using the second filter unit instead of the first speed estimated by using the first filter unit, when the mobile unit moves below a first predetermined speed. Selecting unit 507 selects the third speed estimated by using the third filter unit instead of the second speed estimated by using the second filter unit, when the mobile unit moves below a second predetermined speed. Selecting unit 507 selects the fourth speed estimated by using the fourth filter unit instead of the third speed estimated by using the third filter unit, when the mobile unit moves below a third predetermined speed.

Figure 6:
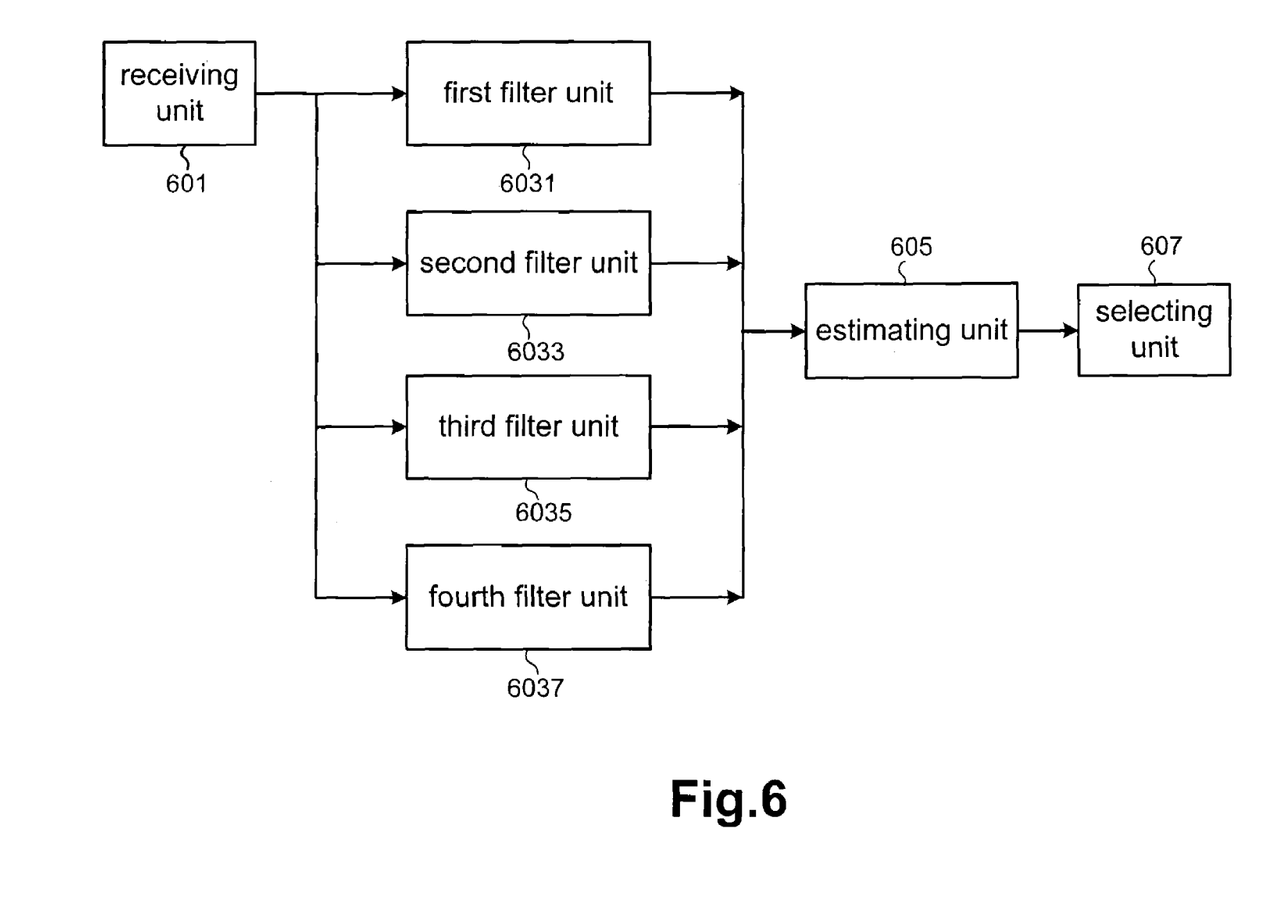
FIG. 6 shows the second exemplary embodiment of the present invention.

FIG. 6 shows the second exemplary embodiment of the present invention. The embodiment further saves hardware resource. The embodiment includes a receiving unit 601, a first filter unit 6031, a second filter unit 6033, a third filter unit 6035, a fourth filter unit 6037, an estimating unit 6051, and a selecting unit 507.

Similarly, the receiving unit 601 receives the signal corresponding to the mobile unit signal. The first filter unit 6031, second filter unit 6033, third filter unit 6035, and fourth filter unit 6037 respectively filter the signal to generate a first signal, a second signal, a third signal, and a fourth signal. However, the embodiment only uses one estimating unit to obtain a first speed, a second speed, a third speed, and a fourth speed based on the first signal, second signal, third signal, and fourth signal. In order to save the hardware resource, the estimating unit 607 uses a switch to switch the transmission paths of the first signal, second signal, third signal, and fourth signal to estimate the movement speed of the mobile unit.

The selecting unit 607 selects the movement speed among the first speed, second speed, third speed, and fourth speed by the method mentioned above.

While the invention has been described in connection with what is presently considered to be the most practical and preferred embodiments, it is to be understood that the invention is not to be limited to the discovered embodiments. The invention is intended to cover various modifications and equivalent arrangement included within the spirit and scope of the appended claims.

The invention claimed is:

1. A method for estimating a movement speed of a mobile unit in a mobile radio communication system, comprising:
    (A) receiving a signal corresponding to a mobile unit transmitting signal;
    (B) generating a first signal by using a first filter unit to filter said signal, said first filter unit having a first cut-off frequency;
    (C) obtaining a first speed by estimating said movement speed based on said first signal;
    (D) generating a second signal by using a second filter unit to filter said signal, said second filter unit having a second cut-off frequency, said second cut-off frequency being lower than said first cut-off frequency;
    (E) obtaining a second speed by estimating said movement speed based on said second signal;
    (F) selecting one of said first speed and said second speed to be said movement speed; and
    (G) selecting said second speed as said movement speed if said first speed is slower than a predetermined speed.

2. The method of claim 1, wherein said first cut-off frequency is 375 Hz, and said second cut-off frequency is 250 Hz.

3. The method of claim 2, wherein said predetermined speed is 120 km/hour.

4. The method of claim 1, wherein said first cut-off frequency is 250 Hz, and said second cut-off frequency is 125 Hz.

5. The method of claim 4, wherein said predetermined speed is 60 km/hour.

6. The method of claim 1, wherein said first cut-off frequency is 125 Hz, and said second cut-off frequency is 62.5 Hz.

7. The method of claim 6, wherein said predetermined speed is 30 km/hour.

8. The method of claim 1, wherein step (C) further comprises:
    obtaining a first Doppler frequency according to the first signal; and
    obtaining said first speed according to the first Doppler frequency.

9. The method of claim 1, wherein step (E) further comprising:
    obtaining a second Doppler frequency according to the second signal; and
    obtaining said second speed according to the second Doppler frequency.

10. A system for estimating a movement speed of a mobile unit, comprising:
    a receiving unit for receiving a signal corresponding to a transmitting signal of said mobile unit;
    a first filter unit for filtering said signal to generate a first signal, said first filter unit having a first cut-off frequency, said first filter unit corresponding to a first speed zone;
    a second filter unit for filtering said signal to generate a second signal, said second filter unit having a second cut-off frequency, said second filter unit corresponding to a second speed zone, a predetermined speed being located between a lower edge of the first of the first speed zone and a higher edge of the second speed zone;
    an estimated unit for obtaining a first speed by estimating said movement speed based on said first signal, and obtaining a second speed by estimating said movement speed based on said second signal; and
    a selecting unit for selecting said second speed as said movement speed if said first speed is slower than said predetermined speed.

11. The system of claim 9, wherein said first cut-off frequency is 375 Hz, and said second cut-off frequency is 250 Hz.

12. The system of claim 11, wherein said predetermined speed is 120 km/hour.

13. The system of claim 9, wherein said first cut-off frequency is 250 Hz, and said second cut-off frequency is 125 Hz.

14. The system of claim 13, wherein said predetermined speed is 60 km/hour.

15. The system of claim 9, wherein said first cut-off frequency is 125 Hz, and said second cut-off frequency is 62.5 Hz.

16. The system of claim 15, wherein said predetermined speed is 30 km/hour.

* * * * *